United States Patent [19]

Jerman

[11] 3,710,456
[45] Jan. 16, 1973

[54] TEACHING AID
[76] Inventor: Max E. Jerman, 1563 Miller Avenue, San Jose, Calif. 95129
[22] Filed: Aug. 10, 1970
[21] Appl. No.: 62,293

[52] U.S. Cl. ................................................35/31 B
[51] Int. Cl. ............................................G09b 19/02
[58] Field of Search........35/31 R, 31 B, 31 D, 32, 33

[56] References Cited

UNITED STATES PATENTS 2,655,737  10/1953  Don Dero..............................35/33
637,964  11/1899  Johnsen................................35/33

FOREIGN PATENTS OR APPLICATIONS 1,160,865  8/1969  Great Britain.........................35/32

Primary Examiner—Wm. H. Grieb
Attorney—Flehr, Hohbach, Test, Albritton & Herbert

[57] ABSTRACT

A teaching aid for pre-school pupils consisting of an elongated rod and articles movable along the rod together with a readily removable mask for selectively hiding one or more of the articles from view as they are moved behind the mask.

1 Claim, 2 Drawing Figures

PATENTED JAN 16 1973    3,710,456
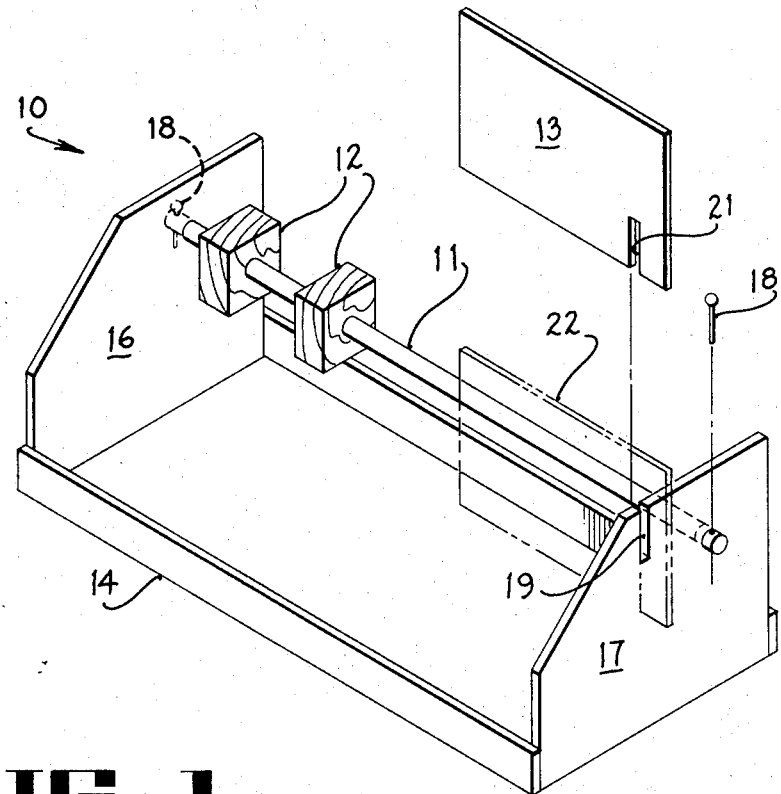
FIG_1
FIG_2
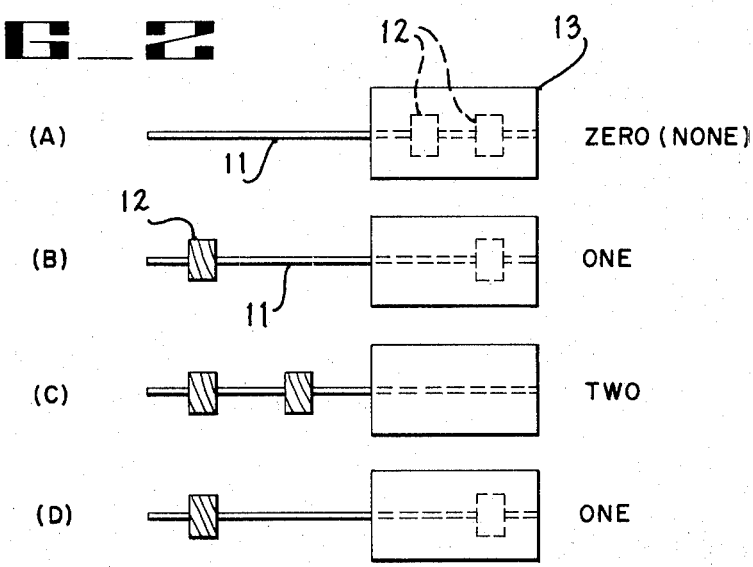
INVENTOR.
MAX E. JERMAN
BY Flehr, Hohbach, Test,
Albritton & Herbert
ATTORNEYS

TEACHING AID

BACKGROUND OF THE INVENTION

This invention pertains to teaching aids and devices and more particularly to a teaching aid for introducing number concepts to the pre-school student or pupil.

SUMMARY OF THE INVENTION AND OBJECTS

In general, there has been provided herein a teaching aid for pre-school pupils characterized by an elongated guide element, articles movable along the guide, and a mask serving to selectively hide one or more of the articles from view as they are moved behind the mask.

It is an object of the invention to provide an improved teaching aid for introducing number concepts to pre-school children and to children in early school grades such as kindergarten through third grade.

The foregoing and other objects of the invention will be readily apparent from the following detailed description of a preferred embodiment of the invention when considered in conjunction with the drawing.

BRIEF DESCRIPTION OF THE DRAWINGS

FIG. 1 shows, in perspective view, a teaching aid according to the invention;

FIG. 2 diagramatically illustrates a sequence of steps in utilizing the structure shown in FIG. 1.

DETAILED DESCRIPTION OF A PREFERRED EMBODIMENT

The teaching aid 10 for use as described further below comprises an elongated support member or guide element such as the dowel rod 11 for supporting and guiding a plurality of articles, such as the rectangular blocks 12, for movement along rod 11.

A mask element 13 is movable into and out of a pupil's line of sight to hide a portion of rod 11 and any articles 12 disposed thereon. Thus, the mask 13 is arranged to selectively block the line of sight so as to hide one or more of the articles 12 when moved behind the mask.

Means forming a base 14 serves to carry rod 11 between a pair of laterally spaced upstanding supports 16, 17. The ends of rod 11 therefore are secured in suitable fashion to the upstanding supports 16, 17 as, for example, by means of disposing the ends of rod 11 in drilled holes formed in supports 16, 17 or otherwise. One suitable means for achieving this is to employ a lock pin 18 entered downwardly through the exposed ends of rod 11.

Support 17 includes an elongated slot 19 adapted to cooperate and mate with an elongated slot 21 formed in the end of mask 13. Slots 19, 21 are arranged to be mutually engaged for holding mask 13 in position to hide the end portion 22 of rod 11 and to be readily removable so as to expose this portion 22.

Slot 19 is, of course, located sufficiently clear of rod 11 whereby blocks 12 can be slidably moved behind mask 13 for purposes of conducting exercises of the following general type and others.

Thus, referring to FIG. 2 a sequence of questions to students and manipulations of blocks 12 can be provided starting with FIG. 2a asking the children how many blocks they see on the rod, the answer being zero or "none." Subsequently, the teacher can move one of the blocks onto the rod into the line of sight of a pupil and ask how many blocks the pupil now sees. Then, as shown in FIG. 2c the teacher can position a second block into view and inquire as to how many blocks the pupil now sees. With the answer being "two" the teacher can reinforce this learning by stating that: "one block and one block provides two blocks." Then the teacher can move one of the blocks behind the mask 13 and again inquire as to how many blocks the student sees and how many blocks are behind the mask. This exercise can be followed up with explanations that by taking away one block from "two" blocks there is one block left.

Similarly other exercises utilizing additional blocks on the rod can also be conducted whereby concepts of numbers such as 2, 1, and 0 as well as concepts as subtraction and addition and further concepts of sets of numbers being divided as well as concepts of multiplication and fractions can be initiated utilizing a device of the kind described.

It is to be understood, of course, that additional blocks 12 will normally be desirable for conducting various operations.

By removing mask 13 entirely the concept of "two" can be readily understood. Thus, the teacher can show and count the single blocks 12 as they reside on rod 11.

Accordingly, mask 13 being readily movable into and out of a masking position can readily serve to supplement each teaching mode or routine.

I claim

1. A teaching aid for introducing concepts in numbers to students at an early age comprising an elongated support member, means for supporting said member in a horizontal orientation, a mask element disposed to hide a portion of said support member from a student, a plurality of articles carried by said member and movable therealong into and out of said hidden portion of said member, said mask being sufficiently dimensioned to hide any of said articles therebehind, the first named said means including an upstanding support member formed to include an elongated slot, an elongated slot formed in an end of said mask and disposed to engage the first named slot for holding said mask in position to hide said portion and readily removable to expose said portion, while permitting said articles to be moved behind said mask and be screened from view.

* * * * *